United States Patent [19]

Tanahashi et al.

[11] Patent Number: 4,883,030
[45] Date of Patent: Nov. 28, 1989

[54] COMBUSTION CHAMBER OF A TWO-STROKE ENGINE

[75] Inventors: Toshio Tanahashi; Masanobu Kanamaru; Toshio Itoh; Kazuhiro Itoh, all of Susono, Japan

[73] Assignee: Toyota Jidosha Kabushiki Kaisha, Japan

[21] Appl. No.: 267,272

[22] Filed: Nov. 4, 1988

[30] Foreign Application Priority Data

Nov. 26, 1987 [JP] Japan .................. 62-295981
Nov. 26, 1987 [JP] Japan .................. 62-295982

[51] Int. Cl.$^4$ .................................. F02B 19/04
[52] U.S. Cl. ........................ 123/193 CH; 123/432
[58] Field of Search ............ 123/432, 308, 193 H, 123/193 CH

[56] References Cited

U.S. PATENT DOCUMENTS

| | | | |
|---|---|---|---|
| 2,456,272 | 12/1948 | Gregory | 123/193 CH |
| 2,492,582 | 12/1949 | Klotsch et al. | 125/193 CH |
| 4,162,662 | 7/1979 | Melchior | 123/65 VD |
| 4,259,933 | 4/1981 | Nakanishi et al. | 123/193 P |
| 4,732,116 | 3/1988 | Tanahashi et al. | 123/65 BA |
| 4,732,117 | 3/1988 | Tanahashi et al. | 123/65 PE |
| 4,732,118 | 3/1988 | Tanahashi et al. | 123/65 VD |
| 4,732,124 | 3/1988 | Nakamura et al. | 123/302 |
| 4,751,902 | 6/1988 | August | 123/308 |
| 4,781,154 | 11/1988 | Tanahashi et al. | 123/65 VD |

FOREIGN PATENT DOCUMENTS

| | | | |
|---|---|---|---|
| 2321577 | 11/1974 | Fed. Rep. of Germany . | |
| 2757648 | 6/1979 | Fed. Rep. of Germany . | |
| 0034108 | 3/1977 | Japan | 123/308 |
| 0052011 | 4/1977 | Japan | 123/308 |
| 62-95131 | 6/1987 | Japan . | |
| 0787697 | 12/1980 | U.S.S.R. | 123/193 CP |
| 1171599 | 8/1985 | U.S.S.R. | 123/193 P |

Primary Examiner—David A. Okonsky
Attorney, Agent, or Firm—Oliff & Berridge

[57] ABSTRACT

A two-stroke engine having an intake valve and an exhaust valve which are arranged on the cylinder head. The peripheral portions of the inner wall of the cylinder head around the intake and the exhaust valves are cut away, and the peripheral portions of the top portion of the inner wall of the cylinder bore around the intake and the exhaust valves are cut away. A masking wall is formed on the inner wall of the cylinder head to mask the valve opening between the valve seat and the peripheral portion of the intake valve, which is located on the exhaust valve side, for the entire time for which the intake valve is open.

19 Claims, 8 Drawing Sheets

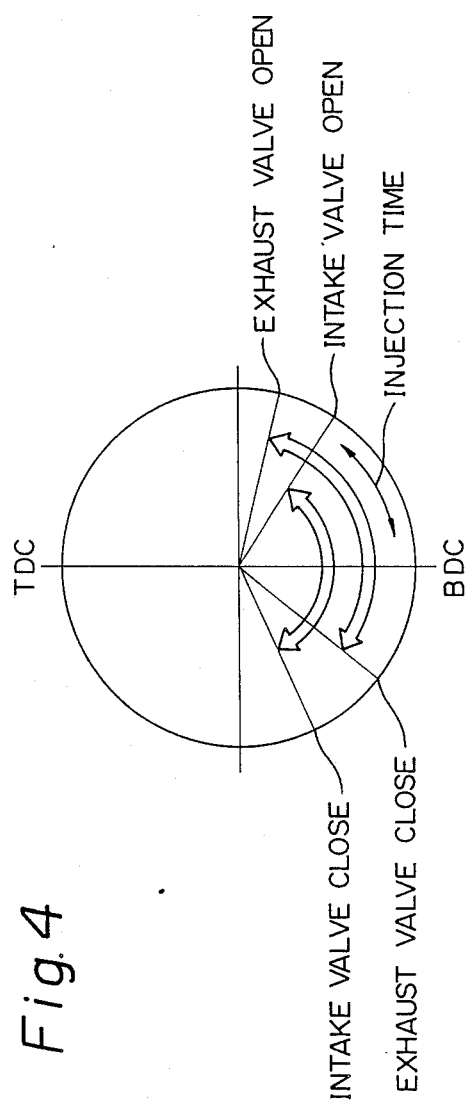
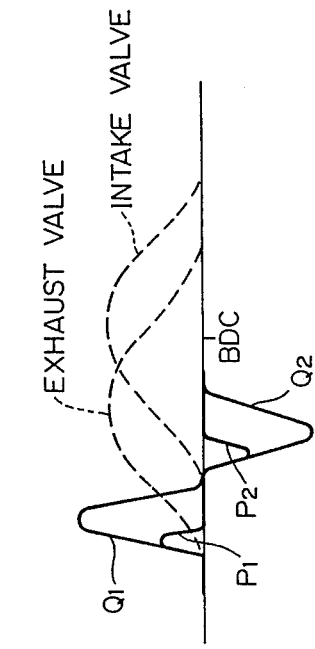
Fig. 4
Fig. 5

COMBUSTION CHAMBER OF A TWO-STROKE ENGINE

BACKGROUND OF THE INVENTION

1. Field of the Invention

The present invention relates to a combustion chamber of a two-stroke engine.

2. Description of the Related Art

In the combustion chamber of a two-stroke engine disclosed in U.S. patent application Ser. No. 215,420 to the same assignee, a pair of the intake valves is arranged on one side of a masking wall extending from the inner wall of the cylinder head toward the combustion chamber, and a pair of the exhaust valves is arranged on the other side of the masking wall. The masking wall masks the valve opening between the valve seat and the peripheral portion of the intake valve, which is located on the exhaust valve side, for the entire time for which the intake valve is open.

In this two-stroke engine, fresh air fed from the intake ports is prevented from instantaneously flowing out into the exhaust ports by the masking wall, and as a result, since the entire fresh air fed from the intake ports flows downward toward the top face of the piston along the inner wall of the cylinder bore, which is located beneath the intake valves, a good loop scavenging operation can be obtained.

Nevertheless, in this two-stroke engine, when the diameters of the intake valves are increased to increase the amount of fresh air fed into the combustion chamber, the flow of the fresh air stream into the combustion chamber from the peripheral portions of the intake valves, which are positioned furthest from the axis of the cylinder bore, is prevented by the inner wall of the cylinder head, and as a result, a problem arises in that it is difficult to increase the amount of fresh air fed into the combustion chamber.

SUMMARY OF THE INVENTION

An object of the present invention is to provide a two-stroke engine capable of obtaining a high output power of the engine by increasing the amount of the fresh air fed into the combustion chamber from the intake port.

According to the present invention, there is provided a two-stroke engine comprising: a cylinder block having therein a cylinder bore having an inner wall; a cylinder head having an inner wall; a piston reciprocally movable in the cylinder bore, the inner wall of said cylinder head and a top face of said piston defining a combustion chamber therebetween; at least one intake valve arranged on the inner wall of the cylinder head; at least one exhaust valve arranged on the inner wall of the cylinder head; the inner wall of the cylinder head having a peripheral cut away portion which extends beyond an extension of the inner wall of the cylinder bore to a position outside thereof at a position at least around the intake valve, the inner wall of the cylinder bore having a top portion having a peripheral cut away portion extending beyond the extension of the inner wall of the cylinder bore to a position outside thereof at a position at least around the intake valve; and masking means arranged between the intake valve and the exhaust valve to mask a valve opening formed between a valve seat and a peripheral portion of the intake valve, which is located on the exhaust valve side, for the entire time for which the intake valve is open.

The present invention may be more fully understood from the description of preferred embodiments of the invention set forth below, together with the accompanying drawings.

BRIEF DESCRIPTION OF THE DRAWINGS

In the drawings:

FIG. 4 is a diagram illustrating the opening time of the intake valve and the exhaust valve;

FIG. 5 is a diagram illustrating the valve lift of the intake valve and the exhaust valve and illustrating a change in pressure in the exhaust port;

DESCRIPTION OF THE PREFERRED EMBODIMENTS

Figure 1:
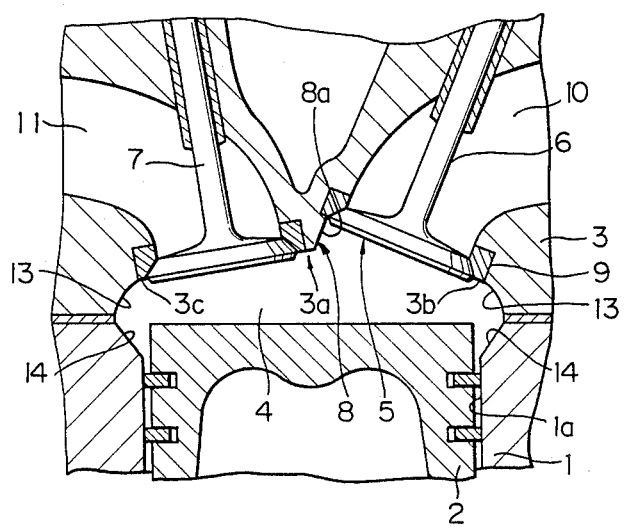
FIG. 1 is a cross-sectional side view of a two-stroke engine.
Figure 2:
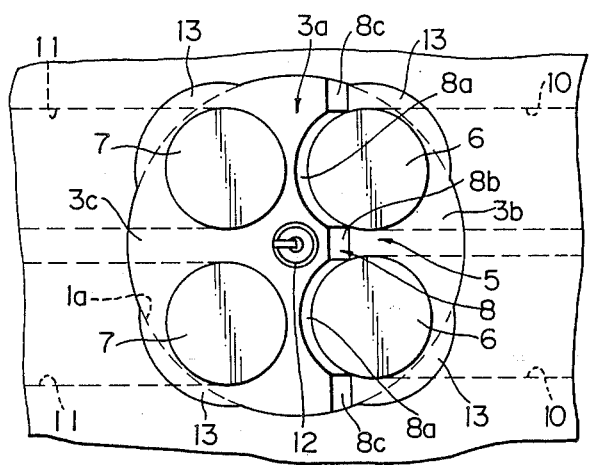
FIG. 2 is a view illustrating the inner wall of the cylinder head.
Figure 3:
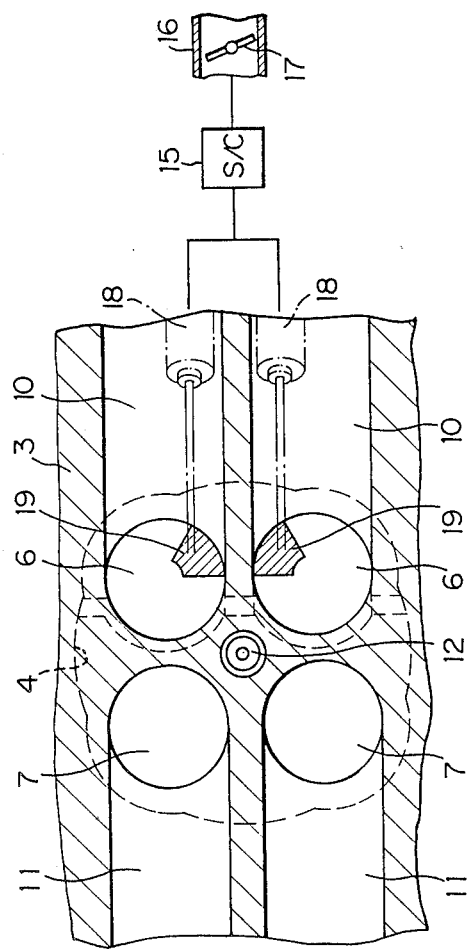
FIG. 3 is a cross-sectional plan view of the cylinder head.

Referring to FIGS. 1 through 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A depression 5 is formed in the inner wall of the cylinder head 3, and thus the inner wall 3a of the cylinder head 3 comprises an inner wall portion 3b forming the bottom wall of the depression 5, and an inner wall portion 3c projecting toward the combustion chamber 4 relative to the inner wall portion 3b. A pair of intake valves 6 is arranged on the inner wall portion 3b of the cylinder head 3, and a pair of exhaust valves 7 is arranged on the inner wall portion 3c of the cylinder head 3. The inner wall portions 3b and 3c of the cylinder head 3 are interconnected via the peripheral wall 8 of the depression 5. The intake valves 6 are arranged on one side of the peripheral wall 8, and the exhaust valves 7 are arranged on the other side of the peripheral wall 8. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 12 is arranged on the inner wall portion 3c of the cylinder head 3 in such a manner that it is located at the center of the inner wall 3a of the cylinder head 3.

Intake ports 10 are formed in the cylinder head 3 for the intake valves 6, and an exhaust port 11 is formed in the cylinder head 3 for the exhaust valves 7. The intake ports 10 are connected to the air cleaner (not shown) via, for example, a mechanically driven supercharger 15 driven by the engine and via an intake duct 16, and a throttle valve 17 is arranged in the intake duct 16. Fuel injectors 18 are arranged on the upper walls of the intake ports 10, and fuel having a small spread angle is injected in the form of a bar-like shape from the fuel injectors 18 toward the hatching areas 19 of the intake valves 6, as illustrated in FIG. 3. These hatching areas 19 are located on the spark plug side of the axes of the intake ports 10 and located on the opposite side of the spark plug 12 with respect to the line passing through the valve stems of both intake valves 6.

As can be seen from FIGS. 1 and 2, the outer peripheral edges of the intake valves 6 and the exhaust valves 7 extend to a position close to the extension of the inner wall of the cylinder bore 1a. The peripheral portions 13 of the inner wall 3a of the cylinder head 3, which portions are located around the intake valves 6 and the exhaust valves 7, are cut away and extend beyond the extension of the inner wall of the cylinder bore 1a to a position outside thereof. These peripheral cut away portions 13 have a substantially spherical shape. In addition, the peripheral portions 14 of the top portion of the cylinder bore 1a, which peripheral portions are located around the intake valves 6 and the exhaust valves 7, are cut away so that the walls of the peripheral portions 14 are smoothly connected to the walls of the corresponding peripheral portions 13 without a step portion therebetween. These peripheral cut away portions 14 have a substantially cylindrical shape.

FIG. 4 illustrates an example of the opening time of the intake valves 6 and the exhaust valves 7 and an example of the injection time. In the example illustrated in FIG. 4, the exhaust valves 7 open earlier than the intake valves 6, and the exhaust valves 7 close earlier than the intake valves 6. In addition, the fuel injection time is set to occur at a time after the intake valves 6 open and before the piston 2 reaches bottom dead center BDC.

FIG. 5 illustrates the valve lifts of the intake valves 6 and the exhaust valves 7 and illustrates changes in pressures $P_1$, $P_2$, $Q_1$, $Q_2$ in the exhaust ports 11. The changes in pressures $P_1$, $P_2$, $Q_1$, $Q_2$ will be hereinafter described.

Figure 6A:
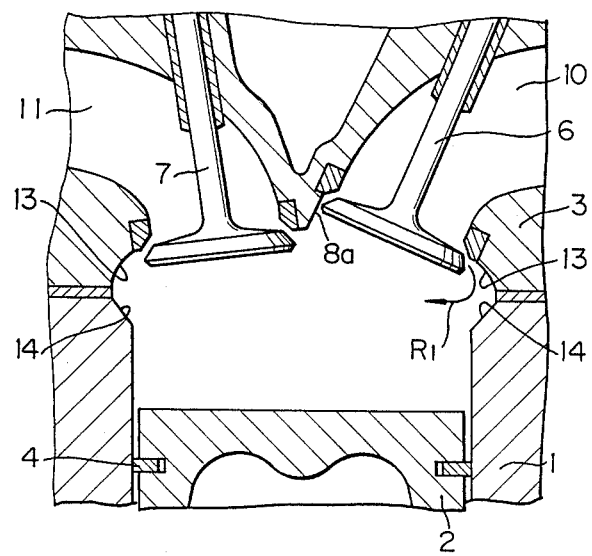
FIGS. 6A and 6B are cross-sectional side views of the engine, illustrating the operation of the engine when under a light load.
Figure 6B:
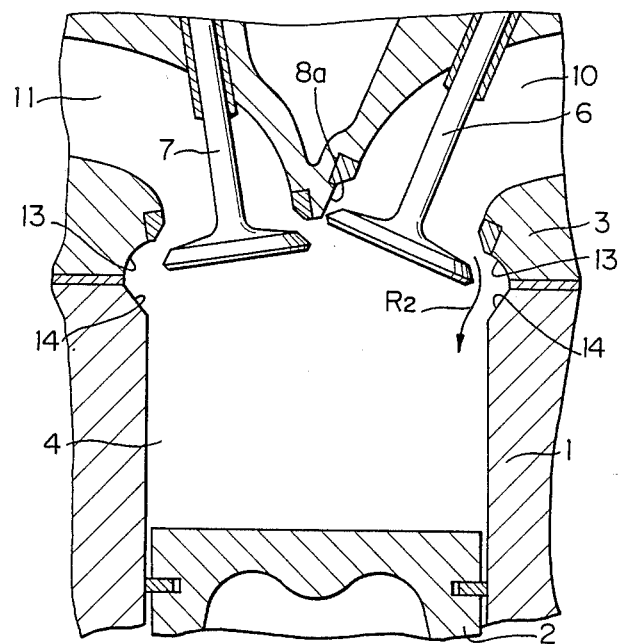
Figure 7A:
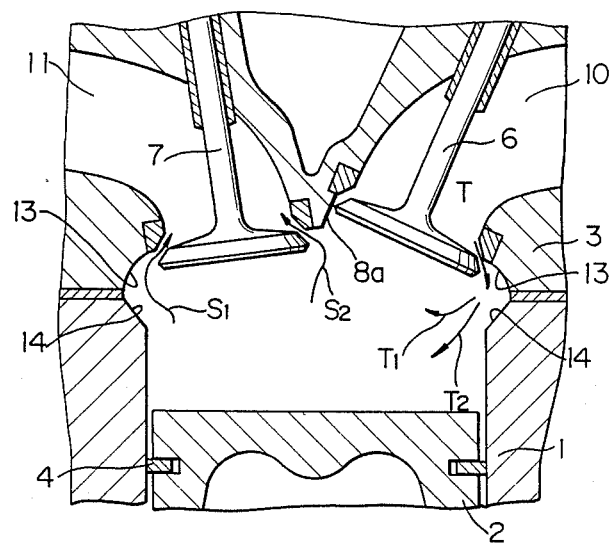
FIGS. 7A and 7B are cross-sectional side views of the engine, illustrating the operation of the engine when under a heavy load.
Figure 7B:
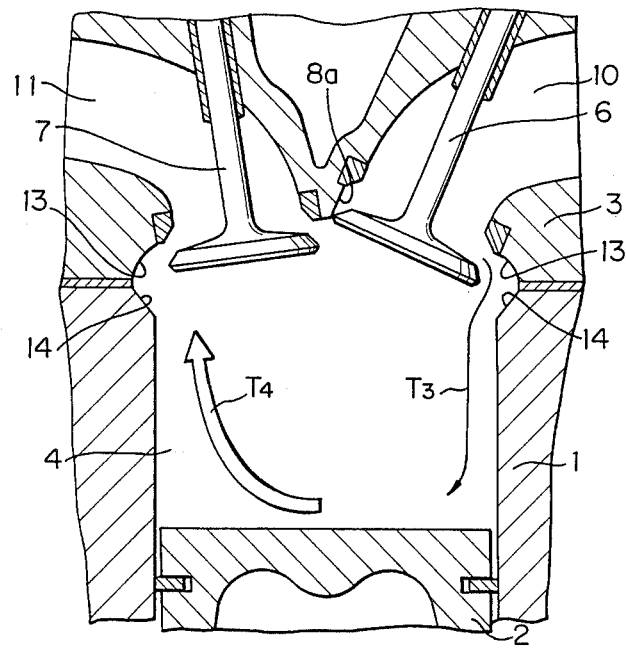

Next, the scavenging operation and the stratifying operation will be described with reference to FIGS. 6 and 7. FIG. 6 illustrates a state where the engine is operating under a light load, and FIG. 7 illustrates a case where the engine is operating under a heavy load. In addition, FIGS. 6(A), and 7(A) illustrate a moment immediately after the intake valves 6 open, and FIGS. 6(B) and 7(B) illustrate a moment when the piston 2 is approximately at bottom dead center BDC.

The scavenging operation and the stratifying operation under a light load operation of the engine will be first described, with reference to FIG. 6.

When the piston 2 moves downward, and the exhaust valves 7 open, burned gas under a high pressure in the combustion chamber 4 flows out into the exhaust ports 11, and thus the pressure in the exhaust ports 11 becomes temporarily positive, as illustrated by $P_1$ in FIG. 5. This positive pressure $P_1$ propagates in the exhaust passage in the downstream direction thereof and is reflected at the joining portion of the exhaust passages for each cylinder. Subsequently, the thus reflected pressure is again propagated toward the exhaust ports 11 in the form of a vacuum pressure. Consequently, when the intake valves 6 open, the vacuum pressure is produced in the exhaust ports 11, as illustrated by $P_2$ in FIG. 5. The time at which the vacuum pressure $P_2$ is produced depends on the length of the exhaust pas When the engine is operating under a light load, the combustion pressure is low, and thus the positive pressure $P_1$ and the vacuum pressure $P_2$ produced in the exhaust ports 11 are relatively small.

When the intake valves 6 open, fresh air containing fuel therein is fed into the combustion chamber 4 from the intake ports 10. At this time, since the masking walls 8a are provided for the valve openings of the intake valves 6, the fresh air and the fuel flow mainly into the combustion chamber 4 from portions of the valve openings of the intake valves 6, which portions are located on the opposite side with respect to the masking walls 8a. In addition, when the intake valves 6 open, since the vacuum pressure is produced in the exhaust ports 11, as illustrated by $P_2$ in FIG. 5, the burned gas positioned at the upper portion of the combustion chamber 4 is sucked out into the exhaust ports 11 due to this vacuum pressure. At this time, as illustrated by the arrow $R_1$ in FIG. 6A, the fresh air and the fuel is pulled toward the exhaust valves 7 due to the movement of the burned gas, and thus the fuel is introduced into a space around the spark plug 12 (FIG. 2). Then, when the piston 2 moves further downward, as illustrated in FIG. 6B, the fresh air containing the fuel therein flows downward along the inner wall of the cylinder bore 1a beneath the intake valves 6, as illustrated by the arrow $R_2$ in FIG. 6B. But, when the engine is operating under a light load, the amount of fresh air fed into the combustion chamber 4 is small, and in addition, the velocity of the fresh air flowing into the combustion chamber 4 is low. As a result, the fresh air does not reach the top face of the piston 2 but stays at the upper portion of the combustion chamber 4, and consequently, when the piston 2 moves upward, since the air-fuel mixture has collected at the upper portion of the combustion chamber 4, and the residual unburned gas has collected at the lower portion of the combustion chamber 4, the interior of the combustion chamber 4 is stratified, and thus the air-fuel mixture is properly ignited by the spark plug 12.

When the engine is operating under a heavy load, since the combustion pressure becomes high, the positive pressure produced in the exhaust ports 11 also becomes high, as illustrated by $Q_1$ in FIG. 5, and in addition, the vacuum pressure produced by the reflection of the positive pressure $Q_1$ becomes great, as illustrated by $Q_2$ in FIG. 5. Furthermore, the peak of the vacuum pressure $Q_2$ occurs a short interval after the production of the positive pressure $P_2$.

As mentioned above, when the engine is operating under a heavy load, the combustion pressure becomes high, and consequently, when the exhaust valves 7 are opened, unburned gas having a high pressure flows into the exhaust ports 11 from the combustion chamber 4, as illustrated by the arrows $S_1$ and $S_2$ in FIG. 7A. At this time, since a large clearance exists between the outer peripheral edge of the exhaust valve 7 and the peripheral cut away portion 13 of the inner wall 3a of the cylinder head 3, the unburned gas instantaneously flows out into the exhaust ports 11, and consequently, the pressure in the combustion chamber 4 becomes low as soon as the exhaust valves 7 are opened. At this time, the intake valves 6 are opened and the fresh air flows into the combustion chamber 4, as illustrated by the arrow T in FIG. 7A. When the engine is operating under a heavy load, the amount of fresh air fed into the combustion chamber 4 is large, and the velocity of the fresh air flowing into the combustion chamber 4 becomes high. Consequently, when the intake valves 6 open, a large amount of the fresh air containing the fuel therein flows into the combustion chamber 4 at a high speed. In addition, at this time, since a large clearance exists between the outer peripheral edge of the intake valve 6 and the peripheral cut away portion 13 of the inner wall 3a of the cylinder head 3, the flow resistance to the fresh air is small. Consequently, the amount of the fresh air fed into the combustion chamber 4 is increased, and the velocity of fresh air flowing into the combustion chamber 4 is increased. Furthermore, as mentioned above, when the exhaust valves 7 are opened, the pressure in the combustion chamber 4 is instantaneously decreased, and thus, when the intake valves 6 are opened, the difference between the pressure in the intake ports 10 and the pressure in the combustion chamber 4 becomes great, and as a result, the amount of fresh air fed into the combustion chamber 4 is further increased, and the velocity of the fresh air flowing into the combustion chamber 4 is further increased.

When the intake valves 6 are opened, and then the burned gas positioned at the upper portion of the combustion chamber 4 is sucked into the exhaust ports 11, due to the production of the vacuum pressure $Q_2$ in the exhaust ports 11, the direction of flow of the fresh air is changed toward the central portion of the combustion chamber 4 as illustrated by the arrows $I_1$ and $I_2$ in FIG. 7A. Then, when the piston 2 moves further downward, the fresh air flows downward along the inner wall of the cylinder bore 12 beneath the intake valves 6 and reaches the top face of the piston 2, as illustrated by $T_3$, in FIG. 7B. Consequently, the burned gas in the combustion chamber 4 is gradually pushed out by the fresh air and discharged into the exhaust ports 11, as illustrated by the arrow $T_4$ in FIG. 7B, and thus a loop scavenging operation is realized in the combustion chamber 4.

As can be seen from FIG. 2, at the valve opening between the intake valve 6 and the valve seat, one-third of the valve opening, which is located on the exhaust valve side, is masked by the corresponding masking wall 8a, and the fresh air is fed from the unmasked two-thirds of the valve opening, which is located at the opposite side of the exhaust valve 7. In addition, the fresh air flowing into the combustion chamber 4 from the intake valve 6 is guided by the fresh air guide walls 8b, 8c so as to flow downward along the inner wall of the cylinder bore 1a. Consequently, when the intake valves 6 open, the entire fresh air flows toward the top face of the piston 2 along the inner wall of the cylinder bore 1a, and thus a good loop scavenging operation is carried out.

In a two-stroke engine equipped with the above intake valve and exhaust valve arrangement, the most efficient scavenging effect can be obtained by carrying out such a loop scavenging operation. In the embodiment illustrated in FIGS. 1 through 3, the provision of the masking walls 8a makes it possible to prevent a flow of fresh air and fuel along the inner wall 3a of the cylinder head 3 which then flows out into the exhaust ports 11, and as a result, a good scavenging operation can be obtained.

In addition, as can be seen from FIG. 1, when the diameter of the intake valves 6 and the exhaust valves 7 are increased, and the valve lifts thereof are increased, it is possible to freely increase the height of the masking wall 8a in accordance with the increases in the diameters and the valve lifts. Consequently, even when the diameters and the valve lifts of the intake valves 6 and the exhaust valves 7 are increased to increase the amount of fresh air fed into the combustion chamber 4, since a good scavenging operation can be carried out, it is possible to increase the output power of the engine.

Figure 8:
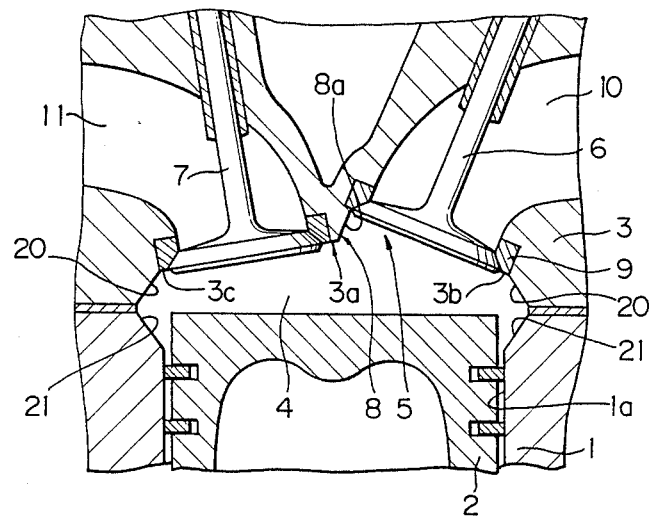
FIG. 8 is a cross-sectional side view of another embodiment of a two-stroke engine.
Figure 9:
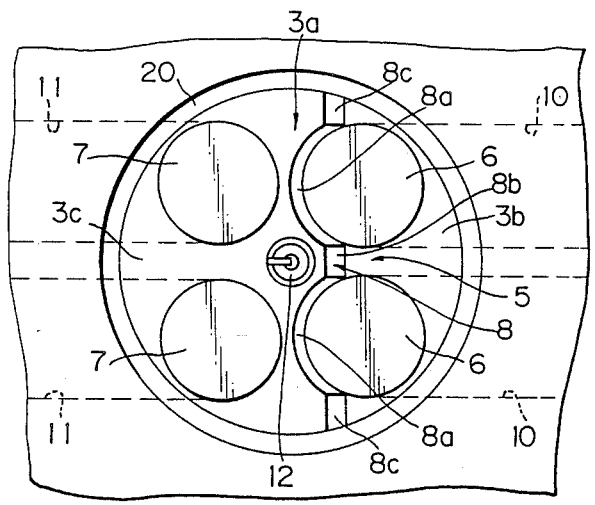
FIG. 9 is a view illustrating the inner wall of the cylinder head of FIG. 8.
Figure 10:
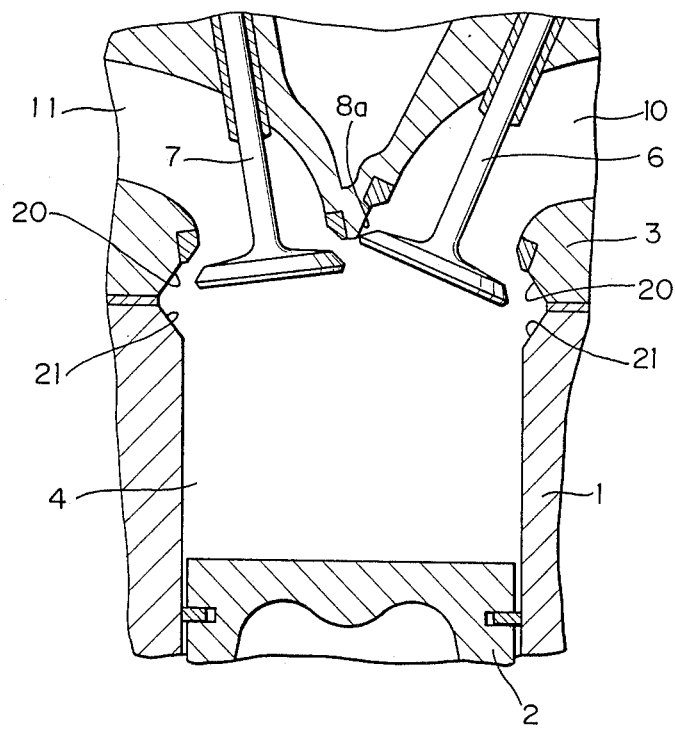
FIG. 10 is a cross-sectional side view of the engine, illustrating the operation of the engine of FIGS. 8 and 9.

FIGS. 8 through 10 illustrate another embodiment of the present invention. In this embodiment, as illustrated in FIGS. 8 and 9, the peripheral portion 20 of the inner wall 3a of the cylinder head 3 is cut away over the entire length thereof and extends beyond the extension of the inner wall of the cylinder bore 1a to a position outside thereof. This peripheral cut away portion 20 has a substantially conical shape. In addition, the peripheral portion 21 of the top portion of the cylinder bore 1a is cut away over the entire length thereof so that the wall of the peripheral cut away portion 21 is smoothly connected to the wall of the peripheral cut away portion 20 without a step portion therebetween. The peripheral cut away portion 21 also has a substantially conical shape.

As can be seen from FIG. 10, also in this embodiment, when the exhaust valves 7 are opened, a large clearance is formed between the peripheral cut away portion 20 and the exhaust valves 7, and when the intake valves 6 are opened, a large clearance is formed between the peripheral cut away portion 20 and the intake valves 6. Consequently, when the engine is operating under a heavy load, a large amount of fresh air is fed into the combustion chamber 4, and thus it is possible to increase the output power of the engine.

Figure 11:
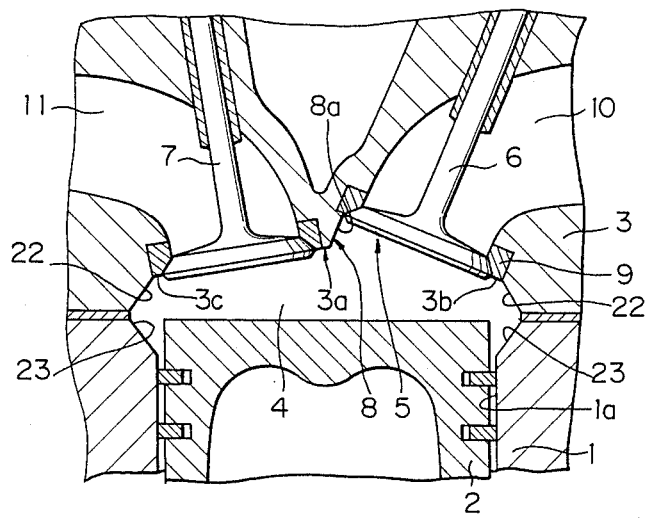
FIG. 11 is a cross-sectional side view of a further embodiment of a two-stroke engine.
Figure 12:
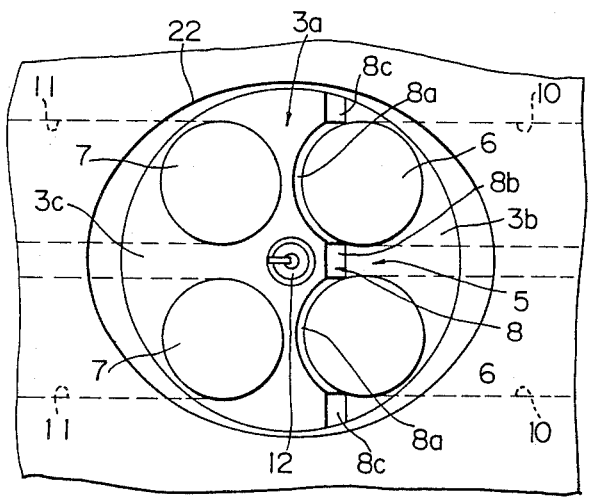
FIG. 12 is a view illustrating the inner wall of the cylinder head of FIG. 11.

FIGS. 11 and 12 illustrate a further embodiment of the present invention. In this embodiment, the peripheral cut away portion 22 of the inner wall 3a of the cylinder head 3 and the peripheral cut away portion 23 of the top portion of the cylinder bore 1a have a substantially elliptical shaped outer contour, and thus have a larger width around the intake valves 6 and the exhaust valves 7. Namely, the peripheral cut away portions 22 and 23 are formed in such a manner that the clearance between the peripheral cut away portion 22 and the intake valves 6 becomes large in a region in which a larger amount of fresh air is fed from the intake valves 6, and that the clearance between the peripheral cut away portion 22 and the exhaust valves 7 becomes large in a region in which a larger amount of burned gas flows out from the exhaust valves 7.

According to the present invention, since the peripheral portion of the inner wall of the cylinder head at least around the intake valves and the peripheral portion of the top portion of the cylinder bore at least around the intake valves are cut away, the flow resistance to the fresh air flowing into the combustion chamber becomes small, and as a result, since the amount of fresh air fed into the combustion chamber is increased, it is possible to increase the output power of the engine.

While the invention has been described by reference to specific embodiments chosen for purposes of illustration, it should be apparent that numerous modifications could be made thereto by those skilled in the art without departing from the basic concept and scope of the invention.

I claim:

1. A two-stroke engine comprising:
    a cylinder block having therein a cylinder bore having an inner wall with a top portion and a lower portion;
    a cylinder head having an inner wall;
    a piston reciprocally movable in said cylinder bore, the inner wall of said cylinder head and a top face of said piston defining a combustion chamber therebetween;
    at least one intake valve arranged on the inner wall of said cylinder head;
    at least one exhaust valve arranged on the inner wall of said cylinder head;
    the inner wall of said cylinder head having a peripheral cut away portion which extends radially beyond an extension of the lower portion of the inner wall of said cylinder bore at a position at least around said intake valve, the top portion of the inner wall of said cylinder having a peripheral cut away portion radially extending beyond the extension of the lower portion of the inner wall of said cylinder bore at a position at least around said intake valve; and
    masking means arranged between said intake valve and said exhaust valve to mask a valve opening formed between a valve seat and a peripheral portion of said intake valve, which is located on said exhaust valve side, for the entire time for which said intake valve is open.

2. A two-stroke engine according to claim 1, wherein said peripheral cut away portion of the cylinder head and said peripheral cut away portion of the cylinder bore are also formed around said exhaust valve.

3. A two-stroke engine according to claim 2, wherein said peripheral cut away portion of the cylinder head has a substantially spherical shaped wall, and said peripheral cut away portion of the cylinder bore has a substantially cylindrical shaped wall.

4. A two-stroke engine according to claim 2, wherein said peripheral cut away portion of the cylinder head extends over the entire length of a periphery of the inner wall of said cylinder head, and said peripheral cut away portion of the cylinder bore extends over the entire length of a periphery of the inner wall of said cylinder bore.

5. A two-stroke engine according to claim 4, wherein said peripheral cut away portion of the cylinder head and said peripheral cut away portion of the cylinder bore have a substantially conical shaped wall.

6. A two-stroke engine according to claim 4, wherein said peripheral cut away portion of the cylinder head and said peripheral cut away portion of the cylinder bore have a substantially elliptical shaped outer contour and have a larger width around said intake valve and said exhaust valve.

7. A two-stroke engine according to claim 1, wherein said masking means has a masking wall arranged close to peripheral portion of said intake valve, which is located on said exhaust valve side, and extending downward toward said piston to a position lower than said intake valve when said intake valve is in the maximum lift position thereof.

8. A two-stroke engine according to claim 7, wherein said masking wall extends in an arc along the peripheral portion of said intake valve.

9. A two-stroke engine according to claim 8, wherein said masking wall extends along approximately one-third of the peripheral portion of said intake valve.

10. A two-stroke engine according to claim 7, wherein said inner wall of said cylinder head has a depression formed thereon and comprises an inner wall portion other than said depression, a bottom wall of said depression, and a circumferential wall of said depression, which is located between said inner wall portion and said bottom wall, said intake valve being arranged on said bottom wall, said exhaust valve being arranged on said inner wall portion, said masking wall being formed on said circumferential wall.

11. A two-stroke engine according to claim 10, wherein the circumferential wall of said depression extends between opposed ends of a circumferential wall of the inner wall of said cylinder head, and a portion of said circumferential wall other than said masking wall forms a fresh air guide wall extending downward toward said piston.

12. A two-stroke engine according to claim 11, wherein said engine is provided with two intake valves and said fresh air guide wall comprises a first guide wall located between said intake valves and second guide walls located between the circumferential wall of the inner wall of said cylinder head and said intake valves.

13. A two-stroke engine according to claim 12, wherein said first guide wall and said second guide walls are located in substantially a same plane which extends substantially in parallel to a line passing through said intake valves.

14. A two-stroke engine according to claim 10, further comprising a spark plug arranged on said inner wall portion approximately at a center of the inner wall of said cylinder head.

15. A two-stroke engine according to claim 1, wherein said exhaust valve opens earlier than said intake valve and closes earlier than said intake valve.

16. A two-stroke engine according to claim 1, wherein said cylinder head has an intake port formed therein and a fuel injector arranged in said intake port.

17. A two-stroke engine according to claim 16, wherein fuel is injected from said fuel injector toward a portion of a rear face of a valve body of said intake valve, which portion is located in the opposite side of said masking means.

18. A two-stroke engine according to claim 17, wherein said fuel has a bar-like shape having a small spread angle.

19. A two-stroke engine according to claim 16, wherein fuel is injected from said fuel injector after said intake valve opens and before said piston reaches bottom dead center.

* * * * *